(12) United States Patent
Vander Linde et al.

(10) Patent No.: US 8,600,665 B2
(45) Date of Patent: Dec. 3, 2013

(54) SYSTEM AND METHOD FOR ALIGNING A PARTICULAR PASSENGER WITH A UNIQUE VEHICLE

(76) Inventors: Dennis Leonard Vander Linde, Cumming, GA (US); Aaron Maurice Cason, Flowery Branch, GA (US)

(*) Notice: Subject to any disclaimer, the term of this patent is extended or adjusted under 35 U.S.C. 154(b) by 110 days.

(21) Appl. No.: 13/159,196

(22) Filed: Jun. 13, 2011

(65) Prior Publication Data

US 2012/0316778 A1 Dec. 13, 2012

(51) Int. Cl.
*G08G 1/13* (2006.01)

(52) U.S. Cl.
USPC .................. 701/433; 340/989; 340/990

(58) Field of Classification Search
USPC .......................................... 701/433
See application file for complete search history.

(56) References Cited

U.S. PATENT DOCUMENTS

| | | | |
|---|---|---|---|
| 2007/0057817 A1* | 3/2007 | Aman | 340/933 |
| 2009/0058685 A1* | 3/2009 | Mc Call et al. | 340/995.24 |
| 2009/0098907 A1* | 4/2009 | Huntzicker et al. | 455/556.1 |
| 2010/0007496 A1* | 1/2010 | Orlassino | 340/572.1 |
| 2011/0015934 A1* | 1/2011 | Rowe et al. | 705/1.1 |
| 2012/0062395 A1* | 3/2012 | Sonnabend et al. | 340/932.2 |
| 2012/0179363 A1* | 7/2012 | Pierfelice | 701/423 |
| 2012/0284209 A1* | 11/2012 | Duffy et al. | 705/418 |
| 2012/0323769 A1* | 12/2012 | Michael | 705/39 |

* cited by examiner

*Primary Examiner* — Khoi Tran
*Assistant Examiner* — Ryan Rink
(74) *Attorney, Agent, or Firm* — James M Smedley LLC; James M. Smedley, Esq.

(57) ABSTRACT

The present invention generally relates to passenger and vehicle paring. Specifically, this invention relates to a system and method for aligning a particular passenger with a unique vehicle through the use of one or more scanners and unique identifiers placed at specific entrances to a facility. The system further relates to a system and method for identifying particular egress routes to align the particular passenger with the unique vehicle.

20 Claims, 4 Drawing Sheets

SYSTEM AND METHOD FOR ALIGNING A PARTICULAR PASSENGER WITH A UNIQUE VEHICLE

FIELD OF THE INVENTION

The present invention generally relates to passenger and vehicle paring. Specifically, this invention relates to a system and method for aligning a particular passenger with a unique vehicle through the use of one or more scanners and unique identifiers placed at specific entrances to a facility. The system further relates to a system and method for identifying particular egress routes to align the particular passenger with the unique vehicle.

BACKGROUND OF THE INVENTION

Transportations systems have always strived to improve the methods by which passengers are aligned with vehicles. While the desire exists to have safe and efficient passenger alignment systems, currently they are very limited in application and/or limited in execution.

Currently, simplistic passenger alignment systems are utilized in airports and other mass-transportation systems. Such systems use video monitors and tabled data that passengers will review in order to locate the gate or terminal where the passenger's transport vehicle will be departing from or arriving at. These systems are rudimentary in comparison with modern technology and the data is not specific to particular passengers.

Some modern passenger alignment systems are capable of sending updates or departure/arrival information directly to the computing devices of one or more passengers. However, again, these systems are limited in use and functionality and are utilized only by mass-transportation providers (e.g., airlines, subways, trains).

While passenger alignment systems are used in mass-transportation settings, they have not been received or utilized in the personal transportation setting. Systems exist in the prior art that allow for a passenger to make a transportation request to a non-unique vehicle, such as in a taxi or other indiscriminant "ride-for-a-fee" service. An example of this can be seen in U.S. Pat. No. 7,840,427 to O'Sullivan. However, these systems are directed to filling spare capacity in a taxi or other indiscriminant "ride-for-a-fee" services, and not pair particular passengers with a unique vehicle.

Therefore, there is a need in the art for a system and method for aligning a particular passenger or set of passengers with a unique vehicle. These and other features and advantages of the present invention will be explained and will become obvious to one skilled in the art through the summary of the invention that follows.

SUMMARY OF THE INVENTION

The present invention provides a passenger alignment system and method for aligning one or more particular passengers with one or more unique vehicles. The system may be comprised of one or more scanners set at one or more entrance points to a location, one or more tags readable by said one or more scanners, one or more passenger readout modules, and one or more optional scanner display components.

According to an embodiment of the present invention, each individual tag of said one or more tags readable by said one or more scanners is utilized to identify a unique vehicle. The unique vehicle is intended to receive one or more particular passengers associated with that unique vehicle.

According to an embodiment of the present invention, the one or more scanners and one or more passenger readout modules are interconnected and capable of communicating and validating data amongst one another.

According to an embodiment of the present invention, each one of said one or more passenger readout modules may be configured to register the entrance of a unique vehicle and display an egress route to one or more particular passengers associated with that unique vehicle.

According to an embodiment of the present invention, the system may be further comprised of an optional scanner display component designed to notify the driver of a unique vehicle which egress point to direct the unique vehicle.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to passenger and vehicle paring. Specifically, this invention relates to a system and method for aligning a particular passenger with a unique vehicle through the use of one or more scanners and unique identifiers placed at specific entrances to a facility. The system further relates to a system and method for identifying particular egress routes to align the particular passenger with the unique vehicle.

According to an embodiment of the present invention, the system and method is accomplished through the use of one or more scanners set at one or more entrance points to a location, one or more tags readable by said one or more scanners, one or more passenger readout modules, and one or more optional scanner display components.

According to an embodiment of the present invention, the one or more scanners may be comprised of any device capable of reading a unique identifier from an appropriate tag. Scanners commonly work by detecting either an active signal transmitted by a tag or a passive signal located on a tag or otherwise readable from the tag. Examples of tags and signals readable by scanners include, but are not limited to, RFID tags, Wi-Fi signals, Bluetooth signals, Cellular signals (e.g., CDMA, GSM) and infrared signals. One of ordinary skill in the art would appreciate that there are numerous types of scanners, tags and/or signals that would be usable with embodiments of the present invention, and embodiments of the present invention are contemplated for use with any type of scanner, tag and/or signal. Additionally, each of the one or more scanners may be configured to read multiple types of tags and/or signals.

According to an embodiment of the present invention, tags do not necessarily need to be their own device or somehow attached to a car. In an exemplary embodiment of the present invention, an operator of a vehicle may utilize a mobile computing device (e.g., smartphone) as their tag. In this embodiment, the mobile computing device would communicate with the scanner via one or more transmission methods (e.g., Bluetooth, Wi-Fi, infrared) and transmit the unique identifier in this manner.

According to an embodiment of the present invention, the one or more passenger readout modules may be comprised of one or more computing devices. One of ordinary skill in the art would appreciate that a computing device appropriate for use with embodiments of the present application may generally be comprised of one or more of a Central Processing Unit (CPU), Random Access Memory (RAM), a storage medium (e.g., hard disk drive, solid state drive, flash memory) and one or more display mediums (e.g., monitors, televisions, projectors). Examples of computing devices usable with embodiments of the present invention include, but are not limited to, personal computers, smartphones, laptops, mobile computing devices, and servers. One of ordinary skill in the art would understand that any number of computing devices could be used, and embodiments of the present invention are contemplated for use with any computing device.

According to an embodiment of the present invention, a passenger readout module may be further comprised of numerous display mediums remotely located from one another. For instance, in an exemplary embodiment of the present invention, a plurality of display mediums associated with a passenger readout module may be located in various rooms of a single building or group of buildings.

According to an embodiment of the present invention, the system may be further comprised of an optional scanner display component. The optional scanner display component may be comprised of one or more display mediums. For instance, in an exemplary embodiment of the present invention, a single display medium may be located in proximity to the one or more scanners and within the line of sight of a unique vehicle. Optionally, the optional scanner display component may be further comprised of a computing device.

In an exemplary embodiment according to the present invention, data may be provided to the various components of the system, stored by the various components of the system and provided by the various components of the system to other components of the system or to users of the system across local area networks (LANs) (e.g., office networks, home networks) or wide area networks (WANs) (e.g., the Internet). In accordance with the previous embodiment, the passenger readout module may be comprised of numerous computing devices communicatively connected across one or more LANs and/or WANs. One of ordinary skill in the art would appreciate that there are numerous manners in which the system could be configured and embodiments of the present invention are contemplated for use with any configuration.

According to an embodiment of the present invention, a passenger readout module is configured to receive data from said one or more scanners. Said one or more scanners and said passenger readout module may be communicatively connected via one or more LANs and/or WANs. Additionally, the one or more LANs and/or WANs may be connected to said one or more scanners and said passenger readout modules through wired means, wireless means or any combination thereof.

Exemplary Embodiments

The system and methods herein described may be utilized in a variety of situations and locations. Particularly, embodiments of the present invention are ideal for use in situations where it is desirable to match one or more particular passengers with one or more unique vehicles. These situations include, but are not limited to, schools and other educational establishments, valet parking areas and events involving very important persons (VIPs) with specific security requirements.

Use in School Settings

In an exemplary embodiment in accordance with an embodiment of the present invention, the system and methods herein described may be configured for utilization at a primary or secondary school. In this particular embodiment, it is important for the safety and security of the children to be paired with the proper departure vehicle.

Schools invariably have a fixed number of entrances and exits for both vehicles and passengers. In this exemplary embodiment, each of the vehicle entrances of the school would be equipped with a scanner configured to read tags associated with each vehicle. The tags would be distributed to the parents or other designated person associated with the one or more children to be picked up from the school. Each tag would have a unique identifier that would identify the unique vehicle associated with the parents or other designated person.

As a unique vehicle containing the tag passes through or near a scanner, the tag would be read by the scanner. The scanner would then register the entry point of the unique vehicle. Ideally, the entry point would be associated with a particular egress point from the school where the unique vehicle would approach and wait for the one or more children to exit the school.

Alternatively, after the scanner reads the tag of a unique vehicle, an optional scanner display component may notify the driver of the unique vehicle which egress point to direct the unique vehicle. In this embodiment, after notifying the driver of the unique vehicle of the appropriate egress point, the passenger readout module would be synchronized with the data from the scanner. The passenger readout module would then present the location of the unique vehicle to the one or more children associated with that particular unique vehicle. Additionally, the passenger readout module may also display the appropriate route for the one or more children to follow to reach the unique vehicle.

Advantageously, through the use of the exemplary embodiment described in the previous example, the safety and the security of the one or more children associated with the unique vehicle are protected. Additionally, the overall efficiency of matching children with the appropriate vehicles is significantly increased.

Figure 1:
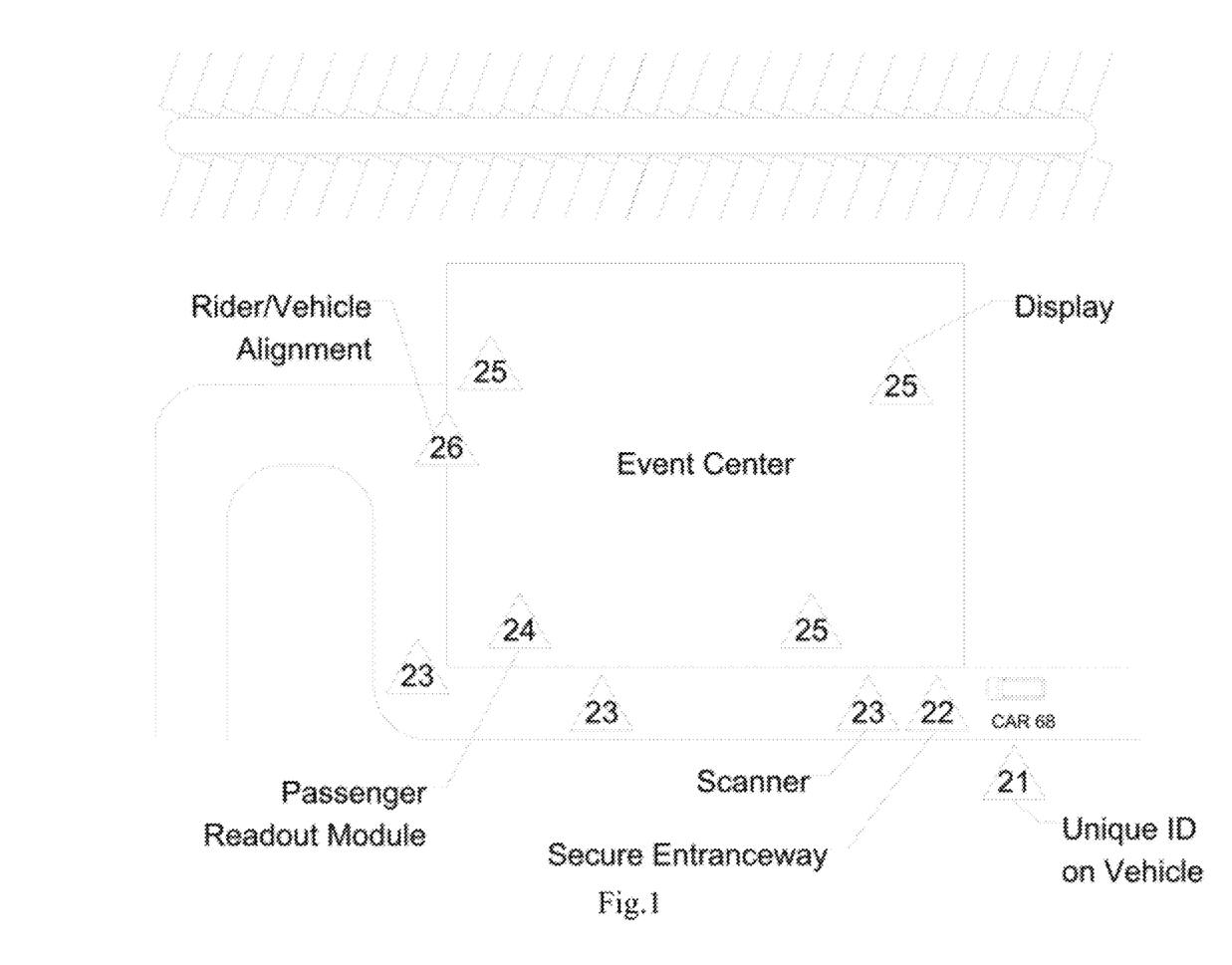
FIG. 1 is a schematic overview of an exemplary embodiment of the present invention.

Turning now to FIG. 1, an exemplary embodiment of the present invention is shown in relation to use at a school. In this embodiment, a single entrance to a school is shown. The entrance to the school utilizes the system and methods herein described. While only one entrance is shown, one of ordinary skill in the art would appreciate that the systems and methods herein described would work equally well on schools with multiple entrances, and embodiments of the present invention are contemplated for use with schools with any number of entrances.

As shown in FIG. 1, a vehicle with a unique identifier enters into the entranceway 1 of the school. In FIG. 1, the unique identifier is shown as the number 68. This identifier is related to information previously stored and configured in the system to represent the particular unique vehicle to one or more passengers who, in this embodiment, are students or other occupants of the school.

As the vehicle approaches a scanner 2, the unique identifier is read and verified. The verified unique identifier is communicated to the passenger readout module 3 in the school for additional processing and analysis. Optionally, and not shown in FIG. 1, the entranceway(s) to school may be equipped with access prevention means (e.g., automatic gates) which will not disengage unless a vehicle is properly verified by the system. In this manner, unauthorized or unrecognized vehicles may be turned away or directed to non-secured entrances. An additional advantage to the use of access prevention means may be to control the flow and total number of vehicles in a parking/waiting area.

The passenger readout module 3 may verify the unique identifier and retrieve information related to one or more passengers associated with the vehicle associated with the unique identifier. The passenger readout module 3 may then display the information to the appropriate display components 4 where the one or more passengers are expected to be. In this example, the displays are located in different classrooms and offices throughout the school. The display components may display information regarding the best egress route 5 to use from the location of a passenger to the unique vehicle.

Once the passenger and vehicle have been aligned, the vehicle may depart the school. Optionally, a secondary scanner may be utilized to register the exit of the vehicle. Advantageously, in this embodiment, the system and methods herein described may keep track of the total number of vehicles in the school parking/waiting area.

Use in Valet Parking Settings

In another embodiment of the present invention, the systems and methods herein described may be configured to be utilized in a valet parking setting. Valet parking settings may include, but are not limited to, restaurants, hotels, casinos and hospitals. Unlike schools, valet parking settings do not have a limited number of specific unique vehicles or passengers that are associated with the particular location.

Since valet parking settings have a set of unique vehicles that may be constantly changing, in whole or in part, tags with limited duration, updatable properties, easily removable form factor or any combination of the aforementioned properties, may be utilized. Updatable properties may include, but are not limited to, make/model/year of a vehicle, information related to the identity of the owner of a vehicle, time-in and time-out. The updatable properties, and the information related thereto, may be stored in one or more components of the system. For instance, the updatable properties, and the information related thereto, may be stored in the scanner component, the tag component, the passenger readout module or any combination thereof.

Depending on the location and type of the valet parking setting, there may or may not be distinct vehicle entrance and exit points. For instance, if a restaurant with a valet parking system in place, in accordance with an embodiment of the present invention, is located on a main road or thoroughfare, there may be a limited number of valet spaces in front of or in the proximity of the restaurant. In this manner, scanners may be located at each of the valet spaces. Once a scanner has detected a unique vehicle, identified by a tag, has entered one of the valet spaces, this information may be transmitted to the passenger readout module which may then present the location of the unique vehicle to the owner of that vehicle and an appropriate egress pathway to reach the vehicle.

In an alternate embodiment, the valet parking system may have an area where unique vehicles enter through, have their tags read by a scanner, and then an optional display component of the scanner would present to the driver of the vehicle the appropriate place for that unique vehicle to park. In this embodiment, at the same time the optional display component of the scanner is presenting information to the driver, it may also communicate that information to a passenger readout module viewable by the owner of the vehicle, identifying to the owner the location of the vehicle as well as the appropriate egress pathway to reach the vehicle.

In another embodiment, the passenger readout module may be configured to communicate the location of the vehicle associated with the owner and the appropriate egress pathway information to a computing device of the owner of the vehicle. For instance, the passenger readout module may be configured to transmit, via a wireless transmission method (e.g., Bluetooth, Wi-Fi), information to a mobile computing device (e.g., smartphone) in the possession of the owner. In this manner, a vehicle owner may be notified when their vehicle is ready and how to best reach their vehicle. Advantageously, location aware devices, such as Global Positioning System (GPS) enabled smartphones, may be used to both identify the position of the owner and provide more accurate egress pathways to the vehicle and real-time updated pathway information to provide a user with accurate directions to their vehicle.

Figure 2:
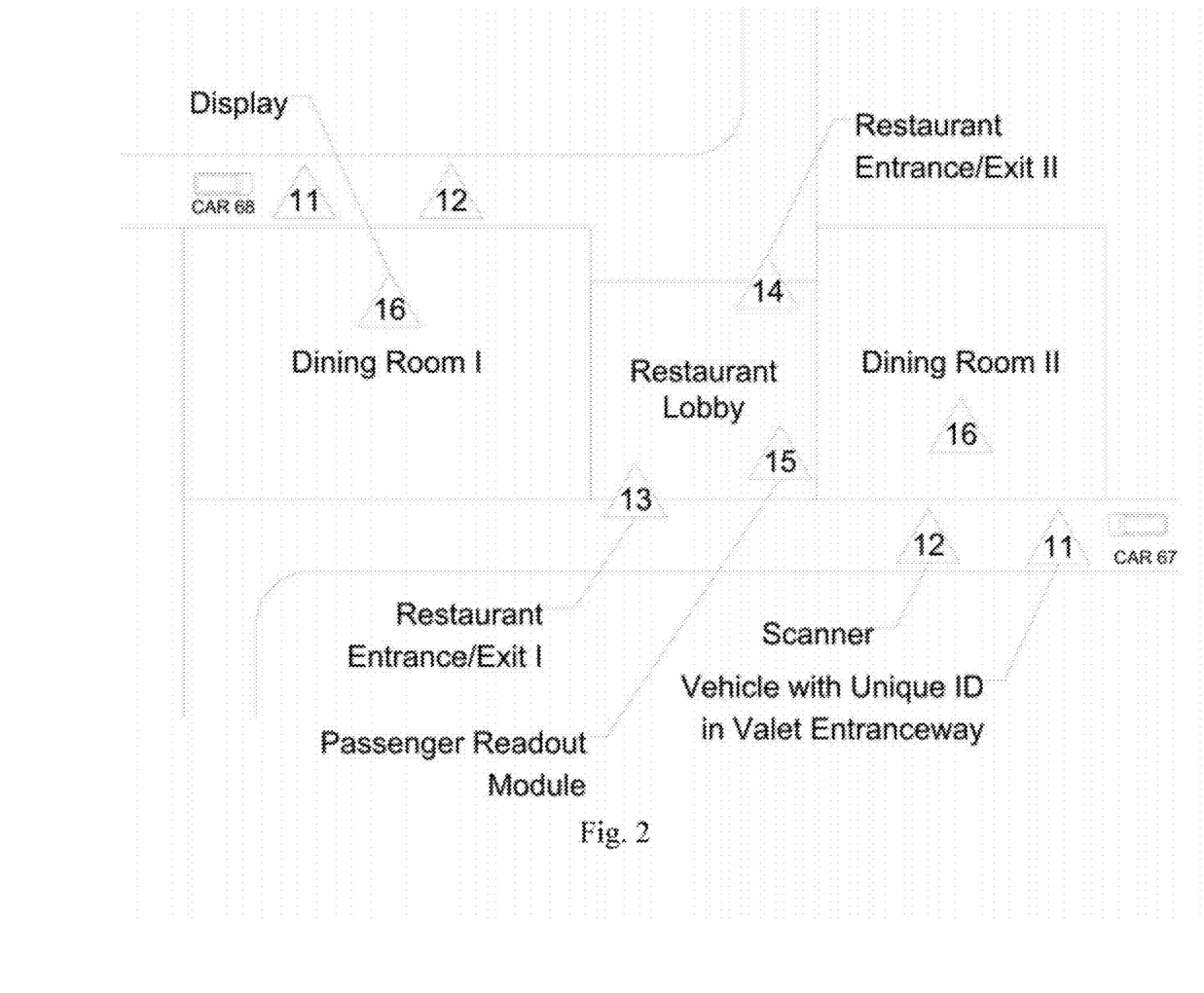
FIG. 2 is a schematic overview of an exemplary embodiment of the present invention.

Turning now to FIG. 2, an exemplary embodiment of the present invention is shown in relation to use in a valet setting at a restaurant. In this exemplary embodiment, as shown in FIG. 2 the restaurant has two distinct entrances. Each entrance to the restaurant is equipped with components of the system herein described. While two entrances (i.e., a first entrance 13 and a second entrance 14) are shown in this example, one of ordinary skill in the art would appreciate that the systems and methods herein described would work equally well on valet settings with one or multiple entrances, and embodiments of the present invention are contemplated for use with valet settings with any number of entrances.

As shown in FIG. 2, vehicles with unique identifiers enter into the entranceways 11 of the restaurant. In the picture, a vehicle with the unique identifier 67 and a second vehicle with the unique identifier 68 enter into the valet parking lanes of the restaurant. These identifiers are related to information previously stored and configured in the system to represent the particular vehicle to one or more passengers who, in this embodiment, are associated with the vehicle. In this example, the passenger is most frequently a driver or other passenger who has previously dropped his/her vehicle off at the valet parking setting.

As the vehicles pass through scanners 12, the vehicles' unique identifiers are read and information regarding these vehicles is processed. If the vehicles entering the valet parking setting do not have tags or other unique identifier components, the vehicle may be being dropped off by a patron of the restaurant. If this is the case, a valet attendant will take the vehicle from its owner and handle the appropriate input of the vehicle information and owner's information into the system. This may include the process of initializing or otherwise configuring a new tag for the vehicle so that it may be recognized by the system as a unique vehicle with a unique identifier.

Continuing with this example, once a vehicle has been identified by scanners 12, the particular scanner 12 identifying the vehicle may communicate the information to the passenger readout module 15. At this point, the passenger readout module 15 may retrieve additional information regarding the owner of a vehicle that was identified by the particular scanner 12. The owner may be notified via a display component 16 associated with particular vehicle owner or in the vicinity of the vehicle owner. For instance, a monitor screen may be located in the dining area, viewable by the vehicle owner. When the vehicle is ready, the screen may present the owner with information regarding the location of the vehicle and the best egress route to reach the vehicle.

In an alternative embodiment, a specialized computing device (e.g., handheld display unit) may be given to the owner by the valet who takes the owner's vehicle. This specialized computing device may be used to notify the valet that the owner is ready to have his or her vehicle brought around. Once the vehicle has been brought around, the system may transmit location and egress information to the specialized computing device.

In yet another alternative embodiment, a computing device associated with the owner may be registered at the time the valet takes the owner's vehicle. For instance, a smartphone belonging to the owner may be registered with the valet. The owner may then utilize his or her smartphone to notify the valet that they are ready to have their vehicle brought around. Once the vehicle has been brought around, the system may transmit location and egress information to the owner's smartphone. One of ordinary skill in the art would appreciate that any computing device associated with an owner may be utilized with embodiments of the present invention, and embodiments of the present invention are contemplated for use with any computing device associated with an owner.

In an alternate embodiment, once a valet is notified that an owner wants to have their vehicle returned, as the valet drives the unique vehicle through the scanner, the tag of the unique vehicle may be read and an optional scanner display component may notify the valet which egress point the owner of the unique vehicle will be waiting at. Alternatively, after notifying the valet of an appropriate egress point, the passenger readout module would be synchronized with the data from the scanner and notify the owner which egress point their vehicle will be at. Additionally, the passenger readout module may also display the appropriate route for the owner to follow to reach the unique vehicle.

Use in VIP Settings

In yet another embodiment of the present invention, the system and methods herein described may be utilized in a setting where one or more VIPs are to be picked up and transported from a location. In this embodiment, and similar embodiments, scanners and tags may be comprised of redundant features for security and accuracy. For instance, tags may be configured with multiple unique identifiers, requiring a scanner that reads multiple unique identifier types or one or more scanners capable of verifying individual unique identifiers contained on the tag. Additionally, redundant sets of scanners may be used to check a unique vehicle at numerous checkpoints along a pathway to pick-up a VIP passenger.

According to an embodiment of the present invention, security measures may be put in place related to the tags, scanners, passenger readout modules, and optional scanner display components. For instance, transmission methods may utilize security standards (e.g., WEP, WPA, WPA2, MD5, PKA). In other embodiments, only hardwired transmission methods may be utilized to reduce the chance of security breaches that may occur when data is permitted to be transferred wirelessly. One of ordinary skill in the art would appreciate that numerous security standards could be utilized with embodiments of the present invention, and embodiments of the present invention are contemplated for use with any security standard.

Figure 3:
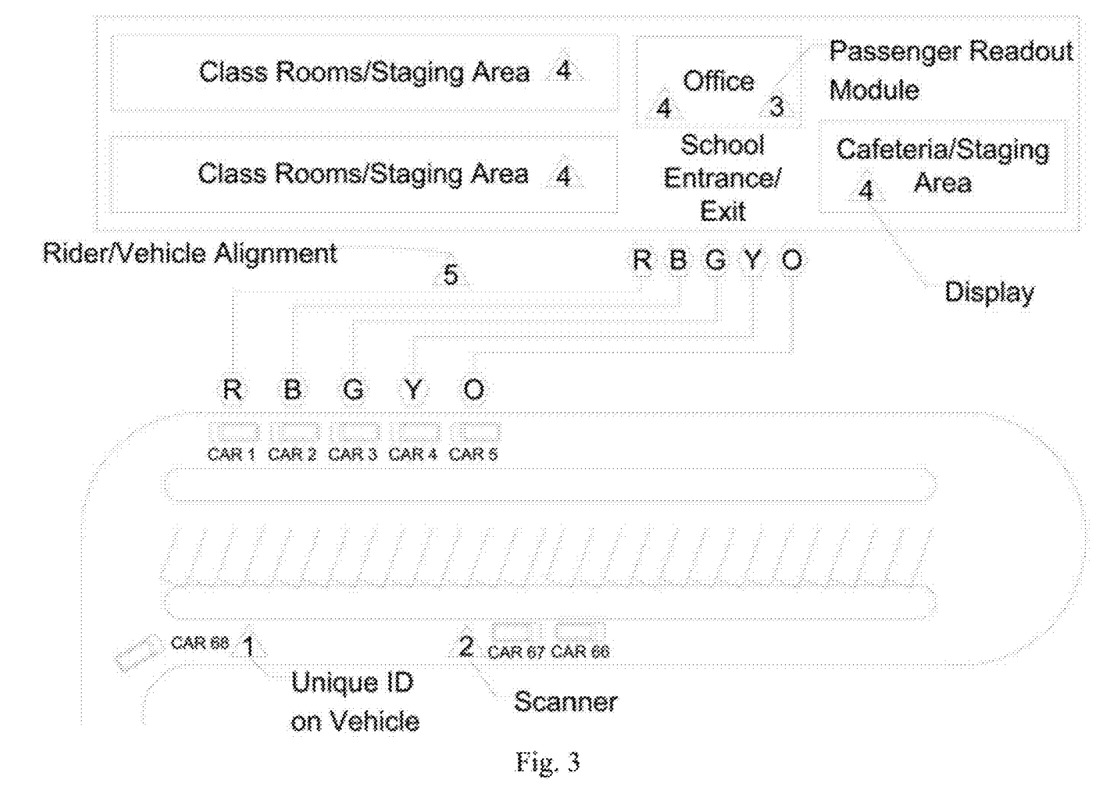
FIG. 3 is a schematic overview of an exemplary embodiment of the present invention.

Turning now to FIG. 3, an exemplary embodiment of the present invention is shown in relation to use at a VIP event. In this embodiment, a single entrance to a VIP event is shown. The entrance to the VIP event utilizes the system and methods herein described. While only one entrance is shown, one of ordinary skill in the art would appreciate that the systems and methods herein described would work equally well on VIP events with multiple entrances, and embodiments of the present invention are contemplated for use with VIP events with any number of entrances.

As shown in FIG. 3, a vehicle 21 with a unique identifier enters into a secure entranceway 22 of the VIP event. Secure entranceway 22 may be protected by one or more security measures. Security measures include, but are not limited to, fences, security gates, security patrolled regions and security cameras. One of ordinary skill in the art would appreciate that there are numerous security measures that could be utilized to secure an entranceway, and embodiments of the present invention are contemplated for use with entranceways secured in any such manner.

In FIG. 3, the unique identifier is shown as the number 68. This identifier is related to information previously stored and configured in the system to represent the particular unique vehicle to one or more passengers who, in this embodiment, are VIPs, security personnel or other or any combination thereof. It would be understood by one of ordinary skill in the art that the exemplary unique identifier in this example would be a complex unique identifier, secured by one or more data security measures.

As the vehicle approaches a scanner 23, the unique identifier is read and verified. The verified unique identifier is communicated to the passenger readout module 24 in the event center for additional processing and analysis. Additionally, the unique identifiers may be checked multiple times, one or more times at each of scanners 23. Depending on the level of security at the VIP event, additional security measures may be located at each scanner 23 in case an anomaly is detected (e.g., error or missed scan along the secured route).

The information received at the passenger readout module 24 may be further processed for validity and security. Once confirmed, the passenger readout module 24 may display vehicle information and egress information to one or more display units 25. In this embodiment, the display units may be located in a room or other area where the VIP is located as well as located in separate rooms containing one or more security personnel that may be required to escort the VIP from their location. The notifications may be done asynchronously, such that the security personnel may be alerted prior to the VIP, giving the security personnel time to prepare and arrive at the VIP's location prior to exiting the event center.

Optionally, as it may be important in situations related to VIP protection to calculate and provide one or more specific egress locations in real-time or near real-time to the driver of a unique vehicle, an optional scanner display component may be utilized in accordance with embodiments of the present invention. In this manner, an optional scanner display component may be utilized to provide the driver of a unique vehicle the specific egress location for one or more VIPs. This allows for additional security as the driver of a unique vehicle may not be previously made aware of the specific egress route for a particular VIP prior to arriving at the scanner. In this manner, if the driver is taken, replaced or otherwise compromised, the driver will not have information relating to which egress point the VIP will be at. The egress point may either be calculated or indicated only at the optional scanner display component when the pickup time arrives. Advantageously, the number of individuals that know specific details regarding the evacuation of a particular VIP is reduced and only revealed at necessary times.

In an exemplary embodiment of the present invention, an optional scanner display component may be utilized in a VIP protection scenario. In this scenario, the optional scanner display component may be comprised of a display component that is only visible by the driver of a unique vehicle or provide a limited viewing angle to protect the displayed information. For instance, the display component of the optional scanner display component may be, but is not limited to, a display in the unique vehicle that is provided data via a secured network or other data transfer method with limited accessibility, a display with limited viewing angle such that only the driver of the unique vehicle could perceive the contents displayed or a display which is contained within an area with limited access and limited viewing access (e.g., an indoor security checkpoint, a walled checkpoint). One of ordinary skill in the art would appreciate that numerous display components could be utilized with VIP protection scenarios in accordance with embodiments of the present invention, and embodiments of the present invention are contemplated for use with any display component.

Exemplary Method

Figure 4:
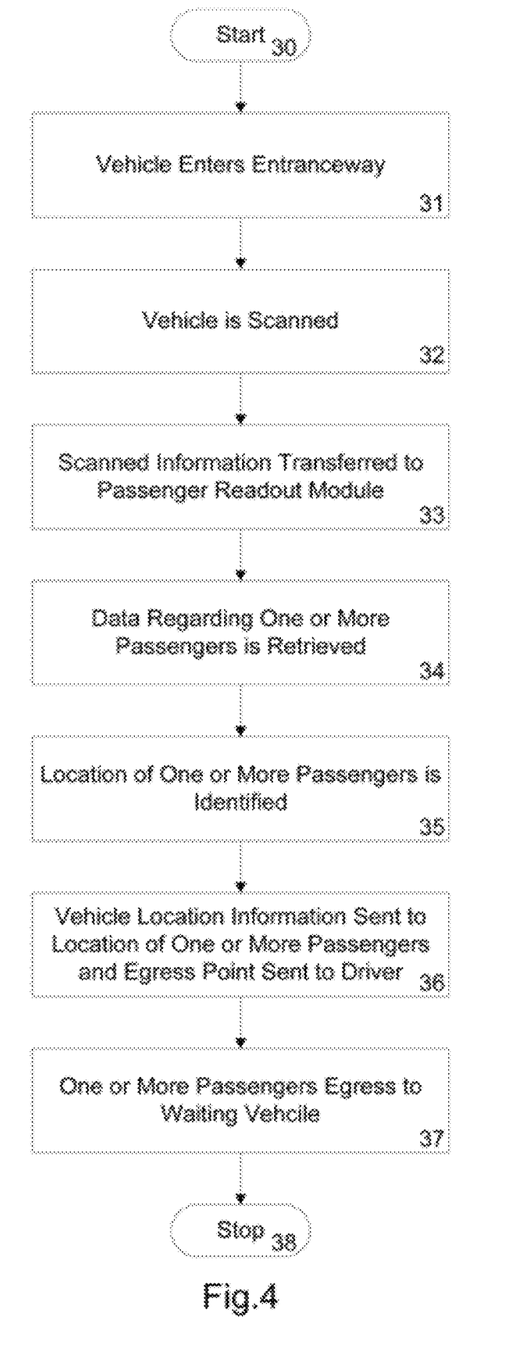
FIG. 4 is a flowchart of a method in accordance with an embodiment of the present invention.

Turning now to FIG. 4, a passenger alignment method, in accordance with an embodiment of the present invention, is shown. The process starts at step 30. At step 31, a vehicle enters an entrance of a location monitored by the system described herein.

At step 32, the vehicle is scanned for a unique identifier associated with a tag that may be contained in, on or about the vehicle or one of the occupants of the vehicle. In certain embodiments, the vehicle may be allowed to drive through the scanner at normal operating speeds. In other embodiments, the vehicle may be stopped until the tag is read. In other embodiments, the vehicle may be allowed to travel at a reduced speed through or near the scanner in order to allow for the scanner to appropriately read and register the tag.

At step 33, the scanned information is transferred to a passenger readout module. The transfer may occur via a wireless communication method, a wired communication method or any combination thereof. Security measures, such as encryption, may also be utilized to protect the information to be communicated.

At step 34, the unique identifier is validated and confirmed at the passenger readout module. At this step 34, data regarding the one or more passengers associated with the unique identifier is also retrieved at the passenger readout module. Data may be located locally or retrieved from remote sources over one or more networks.

At step 35, the passenger readout module uses the data regarding the one or more passengers associated with the unique identifier to further identify the locations of the one or more passengers. The locations may be determined by areas the one or more passengers are supposed to be located at. Alternatively, computing devices or other location aware devices may be utilized to pinpoint the exact location of the one or more passengers.

At step 36, once the one or more passengers are located, the passenger readout module will present display data to one or more display components closest to the one or more passengers as confirmed by the passenger readout module in step 35. The vehicle location information provided to the display components may include a best egress route to each of the one or more passengers, making it easy for each of the one or more passengers to quickly and conveniently reach the vehicle awaiting them. At this point, if an optional scanner display component is being utilized, the optional scanner display component may identify and display to the driver of the vehicle a location to wait for the one or more passengers.

At step 37, once the location and egress information is displayed at the display component, each of the one or more passengers may depart their waiting area and exit towards the waiting vehicle.

At step 38, the one or more passengers have reached the waiting vehicle and may exit the parking/waiting area safely and the process is complete. The previous steps are merely for example purposes. The steps are not required to be executed in this order, and one of ordinary skill in the art would appreciate that these steps could be executed in a variety of different manners as well as having two or more of the steps executing simultaneously.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A method for aligning a passenger with a unique vehicle, said method comprising:
   scanning, with a scanner component, a vehicle containing a tag;
   reading, with a scanner component, a unique identifier from said tag;
   transmitting, from said scanner component, said unique identifier to a passenger readout module;
   analyzing, at said passenger readout module, said unique identifier;
   identifying, at said passenger readout module, a passenger associated with said unique identifier;
   identifying, at said passenger readout module, a location, wherein said location represents the position of said passenger associated with said unique identifier;
   calculating, at said passenger readout module, an egress pick-up point based at least in part on said location;
   transmitting, from said passenger readout module to a scanner display component, said egress pick-up point;
   communicating, from said scanner display component to a driver of said unique vehicle, said egress pick-up point;
   calculating, at said passenger readout module, a best egress route for said passenger,
   wherein said best egress route is comprised of a route between said location and said vehicle;
   transmitting, from said passenger readout module to a display component, said best egress route; and
   displaying, on said display component, said best egress route to said passenger.

2. The method of claim 1, wherein said tag is a RFID tag.

3. The method of claim 1, wherein said tag is a signal from a computing device.

4. The method of claim 1, wherein said unique identifier is a Globally Unique Identifier (GUID).

5. The method of claim 1, wherein said unique identifier is encrypted.

6. The method of claim 1, wherein said transmitting step is accomplished via a wired network.

7. The method of claim 1, wherein said transmitting step is accomplished via a wireless network.

8. The method of claim 1, wherein said location is identified via stored location information.

9. The method of claim 1, wherein said location is identified via a location aware computing device.

10. The method of claim 1, wherein said best egress route consists of a quick and convenient route from said location to said vehicle.

11. A system for aligning a passenger with a unique vehicle, the system comprising:
   a scanner component, wherein said scanner component is configured to read a unique identifier from a tag associated with a unique vehicle;

a passenger readout module, wherein said passenger readout module is communicatively connected to said scanner, wherein said passenger readout module is configured to receive said unique identifier from said scanner, wherein said passenger readout module is configured to identify a passenger related to said unique identifier, wherein said passenger readout module is configured to identify the location of said passenger related to said unique identifier, wherein said passenger readout module is configured to calculate a best egress route from said location to said unique vehicle, wherein said passenger readout module is configured to calculate a location of an egress pick-up point based at least in part on said location, wherein said passenger readout module is configured to transmit said egress pick-up point;

a scanner display component, wherein said scanner display component is communicatively connected to said passenger readout module, wherein said scanner display component is configured to receive said egress pick-up point from said passenger readout module;

wherein said scanner display component is configured to communicate said egress pick-up point to a driver of said unique vehicle; and a display component, wherein said display component is communicatively connected to said passenger readout module, wherein said display component is configured to receive said egress route from said passenger readout module, wherein said display component is configured to display said egress route to said passenger.

12. The system of claim 11, wherein said tag is a RFID tag.

13. The system of claim 11, wherein said tag is a signal from a computing device.

14. The system of claim 11, wherein said unique identifier is a Globally Unique Identifier (GUID).

15. The system of claim 11, wherein said unique identifier is encrypted.

16. The system of claim 11, wherein communication between said scanner component and said passenger readout module is accomplished via a wired network.

17. The system of claim 11, wherein communication between said scanner component and said passenger readout module is accomplished via a wireless network.

18. The system of claim 11, wherein said location is identified via stored location information.

19. The system of claim 11, wherein said location is identified via a location aware computing device.

20. The system of claim 11, wherein said best egress route consists of a quick and convenient route from said location to said vehicle.

* * * * *